Nov. 16, 1971   HANS-JOACHIM M. FÖRSTER ET AL   3,620,103
CONTROL SYSTEM OF AUTOMATICALLY SHIFTING
TRANSMISSIONS, ESPECIALLY FOR
MOTOR VEHICLES
Filed Dec. 5, 1969
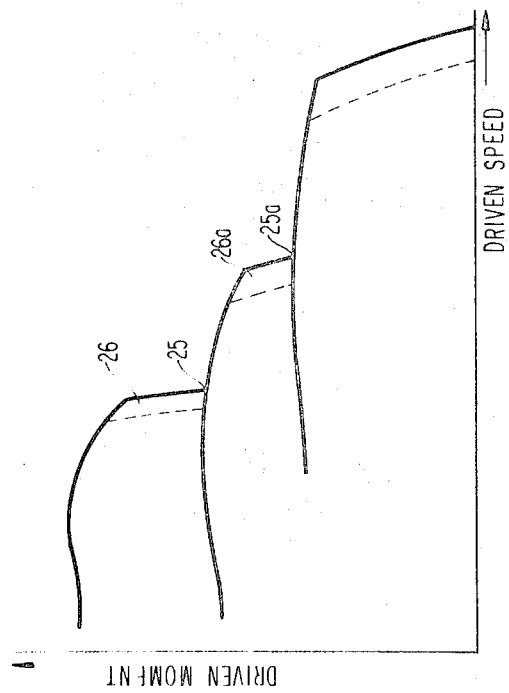
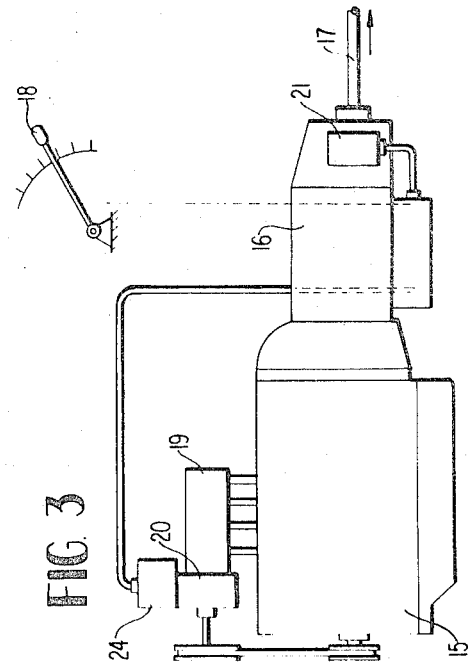
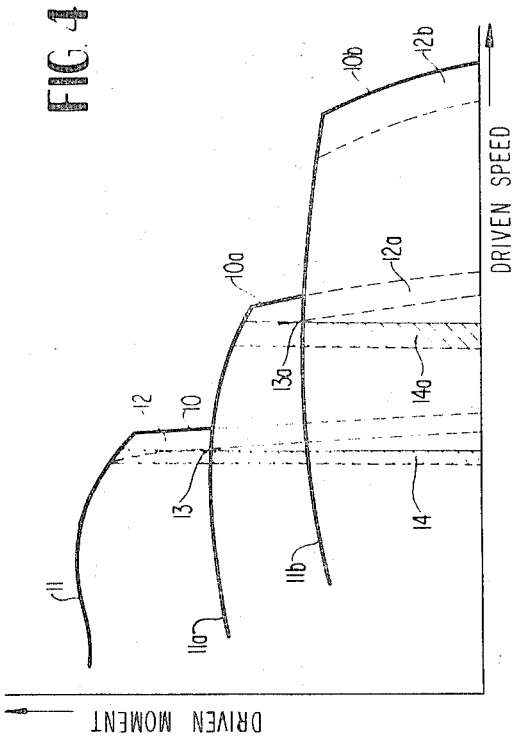
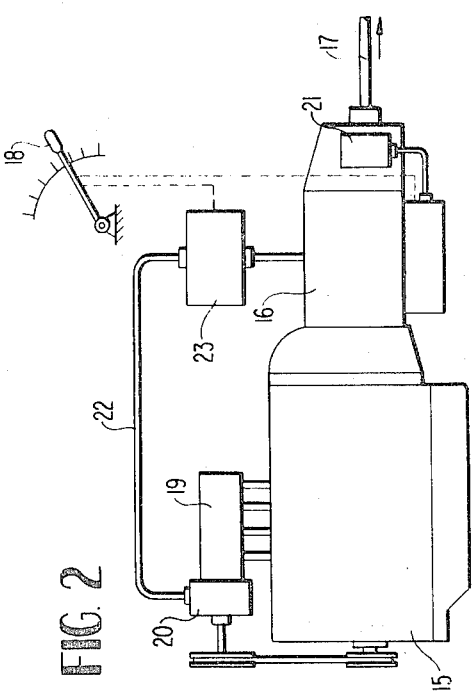
INVENTOR
HANS-JOACHIM M. FÖRSTER
ULRICH ELTZE
BY
ATTORNEYS 3,620,103
CONTROL SYSTEM OF AUTOMATICALLY SHIFTING TRANSMISSIONS, ESPECIALLY FOR MOTOR VEHICLES
Hans-Joachim M. Förster, Stuttgart-Riedenberg, and Ulrich Eltze, Esslingen (Neckar), Germany, assignors to Daimler-Benz Aktiengesellschaft, Stuttgart-Untertürkheim, Germany
Filed Dec. 5, 1969, Ser. No. 882,467
Claims priority, application Germany, Dec. 5, 1968, P 18 12 931.2
Int. Cl. F02d 37/00
U.S. Cl. 74—860                                       11 Claims

ABSTRACT OF THE DISCLOSURE

A control for automatic transmissions of vehicles driven by an engine, in which a first rotational speed controller associated with the transmission controls the shifting-up limits in the transmission and the driving engine includes a second rotational speed controller limiting its maximum rotational speed; the two rotational speed controllers are thereby so connected that one of the rotational speed controllers assumes simultaneously the function of the other.

---

The present invention relates to a control system of automatically operating transmissions for engine-driven vehicles, especially motor vehicles whereby a first rotational speed controller for the control of the shifting-up limits in the transmission is coordinated to the transmission and the driving engine includes a second rotational speed controller for the limitation of its maximum rotational speed.

With known, prior art automatic vehicle transmissions the control of the shifting-up operations takes place customarily in dependence on the driven rotational speed of the engine and on a moment-dependent or torque-dependent magnitude, for example, on the suction-pipe-vacuum of the engine or on the gas pedal position. The shifting-up operation into the next higher speed must thereby take place at the latest when the engine has reached its maximum permissive rotational speed. In practice, the shifting limits, however, can be determined only within a certain tolerance range. On the average, the engine rotational speed range therefore cannot be fully utilized.

Additional problems exist with the vehicles of the type described above. For these vehicles involve normally engines with a rotational speed limit control, in which—after exceeding the limit rotational speed within a predetermined rotational speed range—the fuel supply and therewith the torque are controlled in the direction toward zero. A tolerance zone has to be accepted also in connection therewith. In the automatic transmission the shifting-up operation must then take place at the latest at that vehicle velocity at which the decreasing moment or torque curve of the engaged speed drops below that of the next higher speed. Otherwise, the vehicle would no longer accelerate, and it would therefore not reach the shifting limit. In order that this prerequisite is fulfilled in every case, the tolerance bands of engine and transmission must adjoin to the right and to the left the respective shifting point. This means that as a result of this double tolerance width, a relatively large portion of the available rotational speed range is lost which is disadvantageous in particular with engines having low maximum rotational speeds.

The present invention is concerned with the task to avoid these rotational speed losses by the double joining together of tolerance ranges and by no longer permitting the two controllers to operate independently of one another but to combine the same. The underlying problems are solved in accordance with the present invention with the control systems of the aforementioned type in that such a connection is provided between the limit control of the engine and the transmission control that one of the two rotational speed controllers assumes at the same time the control function of the other.

In this manner an advantageous cooperation of the two automatic controllers is realized so that the width of the tolerance bands is at least considerably reduced or it is now no longer necessary to provide the tolerance bands adjacent one another. In particular, the present invention now proposes that the second automatic rotational speed controller is effectively engaged only in the respective highest speed, whereas it is effectively disengaged in all other speeds, and that the first automatic controller simultaneously determines in all of these other speeds the maximum rotational speed of the engine. Consequently, this means the transmission controller then assumes the leading role—the engine controller only operates in the respective highest speed—and this is realized according to the present invention in such a manner that the connection of the second rotational speed controller to the engine-control member, for example, to an injection pump, is separated or disconnected in dependence on the selector lever position of the transmission and the pulses of the first rotational speed controller are supplied to the engine control member.

Another possibility resides in that, according to the present invention, the second rotational speed controller is connected with the control members of the transmission in such a manner that the shifting-up operation takes place in dependence on the limit control of the engine. In connection therewith the leading role is thus assigned to the engine controller and the transmission controller can, under certain circumstances, be completely economized and dispensed with. The pulse can thereby be derived or taken off directly from the engine controller or from the adjusting member, for example, from the control rack of an injection pump. The transmission may take place either mechanically, electrically, hydraulically or pneumatically. A continuous follow-up control as also a two-point or two-position control, for example, by the opening or closing of a switch actuated by the adjusting member is also within the purview of the present invention.

Accordingly, it is an object of the present invention to provide a control system for automatic transmissions, especially for motor vehicles, which avoids by simple means the aforementioned shortcomings and drawbacks encountered in the prior art.

A further object of the present invention resides in a control system for automatic transmissions which permits a more complete utilization of the engine rotational speed range.

Another object of the present invention resides in a control system for automatically shifting transmissions, especially of motor vehicles, which is simple in construction and minimizes the number of controllers needed for proper operation.

These and other objects, features, and advantages of the present invention will become more obvious from the following description when taken in connection with the accompanying drawing which shows, for purposes of illustration only, two embodiments in accordance with the present invention, and wherein:

FIG. 1 is a diagram, for purposes of explanation, of a prior art automatic transmission;

FIGS. 2 and 3 are somewhat schematic elevational views of two different embodiments of control systems for automatic transmissions in accordance with the present invention; and FIG. 4 is a diagram of the embodiment according to FIG. 3.

Referring now to the drawing wherein like reference numerals are used throughout the various views to designate like parts, and more particularly to FIG. 1, the conventional limit control of the engine according to this figure produces a moment or torque curve 10, 10a and 10b which drops off more or less steeply in all speeds. The limit control for the engine is thereby of known construction and therefore not described in detail herein. The shifting-up operation in such piror art transmission now has to take place at the latest when this dropping-off or decreasing moment curve intersects the moment curve 11a or 11b of the next speed. Of course, a predetermined tolerance zone 12, 12a and 12b has to be accepted in each case. The real shifting-point is therefore located at point 13 or 13a. However, since the transmission controller, also of conventional construction, which determines the shifting-up limits, i.e., the limits at which shifting-up to the next higher speed takes place, in its turn again includes a tolerance zone 14 or 14a, an unnecessary rotational speed loss results.

According to FIG. 2, the engine 15 drives in a conventional manner the drive shaft 17 of the motor vehicle by way of an automatically shifting transmission 16 of conventional construction. The automatic transmission 16 is conventionally adjusted to a predetermined speed range by a selector lever 18. The engine 15 is a conventional injection engine whose injection pump 19 includes a rotational speed controller 20 for the limit control of the engine. This rotational speed controller 20 which is also of conventiional construction, adjusts the control rack of the injection pump 19 in the direction of "zero" as soon as a predetermined maximum rotational speed is exceeded.

The shifting-up operation in the transmission 16 is determined by a further rotational speed controller, i.e., a so-called transmission controller 21 of conventional construction. The control of the transmission 16 is connected by means of lines 22 and by way of a shifting device 23 of conventional construction with the second rotational speed controller 20 for the limit control of the engine. The shifting device 23 is now so connected with the selector lever 18 by conventional means that it always opens-up the connecting line 22 when the selector lever 18 is in a speed position. As a result thereof, the working pressure in the automatic transmission 16 now reaches the second rotational speed controller 20 and disengages or renders ineffective the second rotational speed controller 20 in the lower speeds of the respective speed range. In the upper speed of the respective speed range—i.e., in the illustrated embodiment in the third speed—the second rotational speed controller 20 for the limit control of the engine remains effective. In all lower speeds, the shifting-up operation of the transmission 16 is therefore determined now exclusively by the transmission controller 21.

This means—see FIG. 1 in connection therewith—that now the tolerance zones 12 and 12a do not need to be taken into consideration any longer. One can therefore displace the tolerance zones 14 and 14a so far toward the right until they coincide with the beginning of the control. This means the maximum engine rotational speed in the various transmission ratios or speeds is therefore determined by the transmission controller 21. Exclusively in the highest speed of each selector range—controlled by the shifting device 23 and the transmission control—the second rotational speed controller 20 is again engaged for the engine limit control. The same applies for the reverse speed and for idling.

According to FIG. 3, a transmitter member 24 of any conventional construction is coordinated to or operatively associated with the second rotational speed controller 20 for the engine limit control which senses, for example, the movement of the control rack of the injection pump 19 and transmits the same to the transmission control. The control of the automatic transmission 16 is thus influenced in such a manner that during the beginning of the limit control of the engine, a shifting-up operation into the next speed takes place. The shifting-up operation of the automatic transmission 16 is therefore controlled now by the second rotational speed controller 20, i.e., is therefore controlled by the limit control of the engine.

According to FIG. 4, the shifting points are now located at 25 and 25a whereby only a relatively narrow tolerance zone 26 and 26a is provided. In this case, the shifting-up operation is therefore controlled within the transmission 16 in dependence on the engine limit control, and the transmission controller 21 is utilized in this case exclusively for the reverse shifting operation.

While we have shown and described only two embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are within the scope of those skilled in the art.

What is claimed is:

1. A control of an automatic transmission for engine-driven vehicles, in which a first rotational speed control means for the control of the shifting-up limits in the transmission is coordinated to the transmission and in which a driving engine includes a second rotational speed control means for limiting the maximum rotational speed of the engine, characterized by connecting means operatively connecting the first and second rotational speed control means in such a manner that one of the rotational speed control means assumes the control function of the other.

2. A control system according to claim 1, wherein said first rotational speed control means assumes the control function of the second rotational speed control means in at least some of the speed ranges.

3. A control system according to claim 1, characterized in that the second rotational speed control means is effectively engaged only in the highest speed but is effectively disengaged in all other speeds, and in that the first rotational speed control means simultaneously determines in said other speeds the maximum rotational speed of the engine.

4. A control system with a transmission selector means according to claim 3, characterized in that the connection by said connecting means between the second rotational speed control means and an engine control means is selectively disconnected in dependence on the position of the preselector means, and in that control signals of the first rotational speed control means are effectively supplied to the engine control means.

5. A control system according to claim 4, characterized in that the engine control means is an injection jump.

6. A control system according to claim 5, characterized in that the connection between the second control means and the engine control means is disconnected in dependence on the position of a selector lever of the transmission.

7. A control system according to claim 1, characterized in that the second control means is so connected with control devices of the transmission by said connecting means that the shifting-up operation takes place in dependence on the limit control of the engine.

8. A control system according to claim 7, characterized in that only said second control means is effective in the forward speeds which actuates the transmission control devices by way of a sensing means.

9. A control system according to claim 8, characterized in that said sensing means senses the position of a rack of an injection pump.

10. A control system according to claim 7, characterized in that said second control means actuates the transmission control devices by way of a sensing means.

11. A control system according to claim 10, characterized in that said sensing means senses the position of a rack of an injection pump.

References Cited

UNITED STATES PATENTS

| | | | |
|---|---|---|---|
| 1,089,053 | 3/1914 | Hodgkinson | 74—860 |
| 1,336,462 | 4/1920 | Church | 74—860 |
| 2,362,655 | 11/1944 | Mallory | 74—860 |
| 2,909,078 | 10/1959 | Nallinger | 74—860 |
| 2,968,193 | 1/1961 | Frick | 74—859 |

ARTHUR T. McKEON, Primary Examiner